United States Patent
Yarabolu (10) Patent No.: US 11,658,964 B2
(45) Date of Patent: May 23, 2023

(54) SYSTEM AND METHOD FOR PROVIDING A CONTINUOUS AUTHENTICATION ON AN OPEN AUTHENTICATION SYSTEM USING USER'S BEHAVIOR ANALYSIS

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 17/003,501

(22) Filed: Aug. 26, 2020

(65) Prior Publication Data
US 2022/0070163 A1 Mar. 3, 2022

(51) Int. Cl.
*H04L 9/40* (2022.01)
*H04L 67/50* (2022.01)

(52) U.S. Cl.
CPC ........ *H04L 63/0853* (2013.01); *H04L 63/102* (2013.01); *H04L 63/105* (2013.01); *H04L 63/1425* (2013.01); *H04L 67/535* (2022.05); *H04L 2463/082* (2013.01)

(58) Field of Classification Search
CPC . H04L 63/0853; H04L 63/102; H04L 63/105; H04L 63/1425; H04L 67/22; H04L 2463/082; H04L 63/10; H04L 63/107; G06F 21/31; G06F 16/955; G06F 21/6218
See application file for complete search history.

(56) References Cited

U.S. PATENT DOCUMENTS

| | | |
|---|---|---|
| 6,256,737 B1 | 7/2001 | Bianco et al. |
| 6,405,318 B1 | 6/2002 | Rowland |
| 7,245,218 B2 | 7/2007 | Ikehara et al. |
| 7,778,632 B2 | 8/2010 | Kurlander et al. |
| 8,374,402 B2 | 2/2013 | Black |
| 8,566,956 B2 | 10/2013 | Slater |
| 8,590,018 B2 | 11/2013 | Thavasi et al. |

(Continued)

OTHER PUBLICATIONS

Liu et al., "Access control to web pages based on user browsing behavior," 2017 IEEE 9th International Conference on Communication Software and Networks (ICCSN) Year: 2017 | Conference Paper | Publisher: IEEE.*

(Continued)

*Primary Examiner* — Roderick Tolentino (57) ABSTRACT

A system configured for implementing continuous authentication for a software application is disclosed. The system receives a request from a user to login to an account of the user on the software application. The software application uses open authentication to allow the user to login to the account of the user. Once the user is logged in, the system activates continuous authentication based on monitored user behavior information associated with the user received from one or more organizations. The system monitors accessing the account of the user by monitoring behaviors of a person accessing the account of the user. The system determines whether the behaviors of that person correspond to the monitored user behavior information of the user. If the behaviors of that person correspond to the monitored user behavior information of the user, the system grants the first person to the account of the first user.

20 Claims, 4 Drawing Sheets

(56) References Cited

U.S. PATENT DOCUMENTS

| | | |
|---|---|---|
| 8,626,667 B2 | 1/2014 | Walker et al. |
| 8,800,056 B2 | 8/2014 | Chow |
| 9,246,945 B2 | 1/2016 | Chari et al. |
| 9,396,319 B2 | 7/2016 | Shuart et al. |
| 9,646,261 B2 | 5/2017 | Agrafioti et al. |
| 9,686,275 B2 | 6/2017 | Chari et al. |
| 9,705,676 B2 | 7/2017 | Quirk et al. |
| 9,734,169 B2 | 8/2017 | Redlich et al. |
| 9,956,341 B2 | 5/2018 | Hockman |
| 10,042,993 B2 | 8/2018 | Beigi |
| 10,084,920 B1 | 9/2018 | Gainsboro et al. |
| 10,091,184 B2 | 10/2018 | Smith et al. |
| 10,140,441 B2 | 11/2018 | Cheng et al. |
| 10,275,578 B2 | 4/2019 | Bilobrov et al. |
| 10,348,716 B2 | 7/2019 | Wood |
| 10,437,975 B1 | 10/2019 | Shelton et al. |
| 10,637,864 B2 | 4/2020 | Ohayon et al. |
| 10,652,237 B2 | 5/2020 | Mosenia et al. |
| 2006/0288234 A1 | 12/2006 | Azar et al. |
| 2007/0011039 A1 | 1/2007 | Oddo |
| 2007/0266257 A1 | 11/2007 | Camaisa et al. |
| 2008/0184349 A1 | 7/2008 | Ting |
| 2010/0030567 A1 | 2/2010 | Zalewski |
| 2010/0077484 A1 | 3/2010 | Paretti et al. |
| 2010/0115610 A1 | 5/2010 | Tredoux et al. |
| 2011/0016534 A1 | 1/2011 | Jakobsson et al. |
| 2012/0137340 A1 | 5/2012 | Jakobsson et al. |
| 2013/0067546 A1 | 3/2013 | Thavasi et al. |
| 2013/0067547 A1 | 3/2013 | Thavasi et al. |
| 2013/0239195 A1 | 9/2013 | Turgeman |
| 2013/0267204 A1 | 10/2013 | Schultz et al. |
| 2013/0282331 A1* | 10/2013 | Cohen .................... G06F 17/18 <br> 702/179 |
| 2013/0305357 A1 | 11/2013 | Ayyagari et al. |
| 2013/0343616 A1 | 12/2013 | Forero et al. |
| 2014/0215612 A1* | 7/2014 | Niccolini ............ H04L 63/1425 <br> 726/22 |
| 2015/0169858 A1 | 6/2015 | Tg |
| 2015/0213245 A1 | 7/2015 | Tartz et al. |
| 2015/0242605 A1 | 8/2015 | Du et al. |
| 2015/0341350 A1 | 11/2015 | Mandal et al. |
| 2017/0034164 A1* | 2/2017 | Khalil ................. H04L 63/0876 |
| 2017/0193211 A1 | 7/2017 | Blaket et al. |
| 2017/0308741 A1 | 10/2017 | Gleim et al. |
| 2018/0069867 A1* | 3/2018 | Grajek ................ H04W 12/068 |
| 2019/0066501 A1 | 2/2019 | O'Sullivan |
| 2019/0132224 A1* | 5/2019 | Verma .................... H04L 43/04 |
| 2019/0205945 A1 | 7/2019 | Schuster et al. |
| 2019/0340610 A1 | 11/2019 | Song et al. |
| 2019/0354644 A1* | 11/2019 | Orhan ....................... G06N 3/08 |
| 2019/0362245 A1* | 11/2019 | Buda ....................... G06N 7/01 |
| 2020/0111096 A1 | 4/2020 | Liu et al. |
| 2020/0151496 A1* | 5/2020 | Cao ....................... G06F 18/214 |
| 2020/0293657 A1* | 9/2020 | Chai ................... G06F 11/3089 |
| 2021/0227000 A1* | 7/2021 | Wang .................. H04L 65/1036 |

OTHER PUBLICATIONS

Thanh et al., "Implementation of open Two-Factor Authentication service applied to Virtual Private Network," The International Conference on Information Networking 2013 (ICOIN) Year: 2013 | Conference Paper | Publisher: IEEE.*

* cited by examiner

SYSTEM AND METHOD FOR PROVIDING A CONTINUOUS AUTHENTICATION ON AN OPEN AUTHENTICATION SYSTEM USING USER'S BEHAVIOR ANALYSIS

TECHNICAL FIELD

The present disclosure relates generally to authentication technologies and information security, and more specifically to a system and method for providing a continuous authentication on an open authentication system using user's behavior analysis.

BACKGROUND

Open authentication systems do not provide a secure authentication method. A platform that uses an open authentication system for authenticating users implements standard open protocols that are not secure. The platform implements the standard open protocols for transmitting and receiving authentication tokens for authenticating the users over the Internet. These standard open protocols may be intercepted by a third party by a variety of cyberattacks, such as brute force attacks. As such, platforms that use open authentication systems for authenticating users are vulnerable to malicious attacks.

SUMMARY

In one embodiment, a system for implementing continuous authentication for a software application includes a memory operable to store monitored user behavior information associated with a first user received from one or more organizations. The first user is a client of the one or more organizations. The monitored user behavior information associated with the first user comprises behaviors of the first user while the first user has been accessing a particular account of the first user associated with each organization from among the one or more organizations. The monitored user behavior information comprises one or more of an average typing speed in a particular period, an average typing error in the particular period, and mouse movement patterns associated with the first user. The system also includes a processor that is associated with a server and operably coupled to the memory. The processor is configured to receive a request from the first user to access an account of the first user on a software application. The software application uses an open authentication to allow the first user to log in to the account of the first user on the software application by authenticating another account of the first user associated with a different organization. The one or more organizations are associated with the software application. The processor activates continuous authentication of the first user based at least in part upon a plurality of monitored user behavior information received from the one or more organizations. In continuous authentication, the processor uses the plurality of monitored user behavior information associated with the first user to determine whether the first user is accessing the account of the first user on the software application. The processor monitors accessing the account of the first user by monitoring the behaviors of a person who is accessing the account of the first user on the software application. The processor determines whether the behaviors of the person who is accessing the account of the first user correspond to the plurality of monitored user behavior information associated with the first user. In response to a determination that the behaviors of the person accessing the account of the first user correspond to the plurality of monitored user behavior information associated with the first user, the processor determines that the person accessing the account of the first user is the same as the first user. The processor the first user access to the account of the first user.

Current authentication technologies are nor configured to provide a secure open authentication system. A software application that uses open authentication systems is vulnerable to malicious attacks. In one example, a software application that uses an open authentication system may provide a platform for users to view and access their accounts from other organizations on the software application. As such, confidential data in those accounts of users are at risk of exposure due to the lack of a secure authentication system in authenticating users of the software application. Certain embodiments of this disclosure provide unique solutions to technical problems of the current authentication technologies, including those problems described above. For example, the disclosed system provides several technical advantages, which include: 1) implementing continuous authentication for a software application that uses an open authentication system; 2) using user behavior information associated with a particular user received from other organizations for implementing the continuous authentication on the software application; 3) determining whether a person who is accessing an account of the particular user on the software application is the same as the particular user by comparing the behavior information associated with the particular user with behaviors of the person who is accessing the account of the particular user; and 4) preventing the person (who is attempting to access the account of the particular user) from accessing the account of the particular user on the software application if it is determined that person is not the same as the particular user.

As such, this disclosure may improve the current authentication technologies by implementing continuous authentication for a platform that uses an open authentication system. Accordingly, the disclosed system provides a practical application of improving the security of the confidential data of users accessible on their accounts in the software application. Thus, by improving the security of the confidential data of the users of the software application, the security and operation of the software application, a server associated with the software application, and servers associated with other organizations with which the users have accounts and able to view their respective accounts in the software application.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
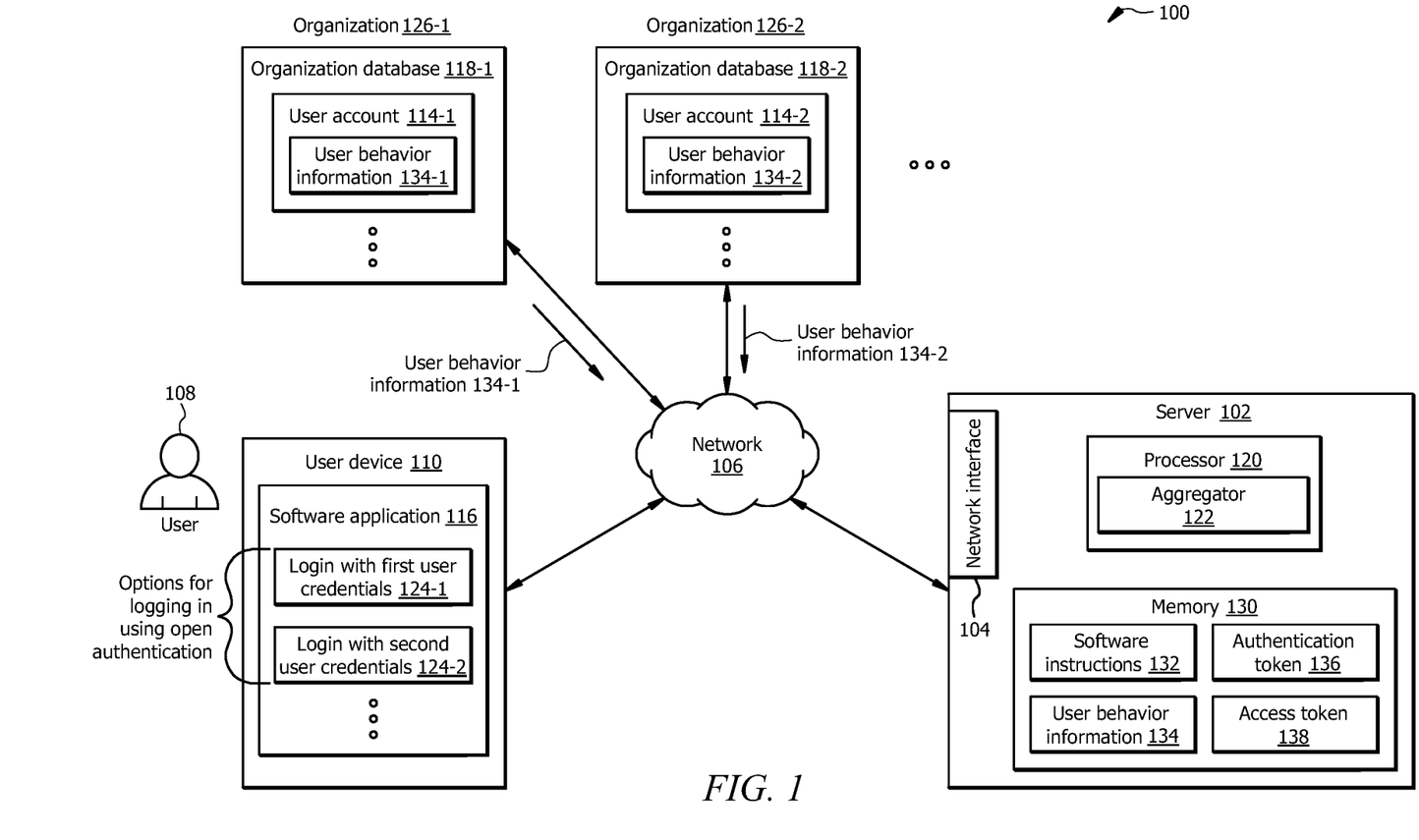
FIG. 1 illustrates one embodiment of a system configured to implement continuous authentication for a software application.

FIG. 1 illustrates one embodiment of a system 100 configured to implement a continuous authentication for a software application 116. In one embodiment, the system 100 comprises a server 102 that includes a processor 120 in signal communication with a memory 130 and network interface 104. Memory 130 includes software instructions 132 that when executed by the processor 120 cause server 102 to perform one or more functions described herein. The server 102 is configured to communicate with organization databases 118 associated with different organizations 126 and user devices 110 via the network interface 104 through the network 106. The organization databases 118 provide information, such as user behavior information 134, which may be used by software instructions 132 and/or processor 120. In one embodiment, the processor 120 executes software instructions 132 to implement an aggregator 122. In other embodiments, system 100 may not have all of the components listed and/or may have other elements instead of, or in addition to, those listed above.

In general, system 100 improves the functionality of user authentication technologies by implementing continuous authentication on a software application 116 which uses an open authentication system.

Server 102 is generally a server, or any other computing device configured to communicate with other computing devices, such as other servers, user devices (e.g., user devices 110), databases (e.g., organization databases 118), via the network interface 104 through the network 106. The server 102 and the software application 116 are associated with a particular organization. In one example, server 102 may be a backend server (associated with the particular organization) that manages the authentication process of accessing the software application 116.

Network interface 104 is configured to enable wired and/or wireless communications (e.g., via network 106). The Network interface 104 is configured to communicate data between the server 102 and other devices (e.g., user devices 110), servers, databases (e.g., organization databases 118), systems, or domain(s). For example, the Network interface 104 may comprise a WIFI interface, a local area network (LAN) interface, a wide area network (WAN) interface, a modem, a switch, or a router. The processor 120 is configured to send and receive data using the network interface 104. The Network interface 104 may be configured to use any suitable type of communication protocol as would be appreciated by one of ordinary skill in the art.

Network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

User 108 is generally any person who has one or more accounts 114 in one or more organizations 126. For example, the user 108 may have a first account 114-1 in a first organization 126-1; and a second account 114-2 in a second organization 126-2. In one example, the first organization 126-1 may be a financial organization that provides financial services to its clients (e.g., the user 108), such as transferring funds, receiving funds, managing loans, etc. In one example, the second organization 126-2 may be an accounting organization that provides accounting services to its clients (e.g., users 108), such as managing their taxes, etc. In other examples, the first organization 126-1 and the second organization 126-2 may be any organizations that provide services to their clients (e.g., users 108).

User device 110 is generally any computing device configured to communicate with other computing devices, servers (e.g., server 102), databases (e.g., organization databases 118), etc. through the network 106. The user device 110 is configured to perform specific functions described herein and interact with users 108, e.g., via user interfaces. Examples of the user device 110 include but are not limited to desktop computers, mobile phones, tablet computers, laptop computers, servers, etc.

Software application 116 is generally any software/web/mobile application that uses open authentication for authenticating the user 108 to login to their account in the software application 116. Typically, the software application 116 provides username and password fields to the user 108 for logging in. The software application 116 authenticates the user 108 if he/she enters the correct username and password, respectively, in the username and password fields.

Open Authentication System

Typically, the open authentication systems (such as OAuth, OAuth 2.0, etc.) generally allow the user 108 to register an account in the software application 116 without actually generating user credentials (e.g., username and password) for the software application 116. In open authentication systems, the user 108 is able to login to their account in the software application 116 using another user credentials 124 of the user 108 associated with another organization. For example, when the user 108 wishes to login to their account in the software application 116, the software application 116 may provide one or more options to the user 108 to choose another of their user credentials 124, such as their email account credentials 124-1, social media credentials 124-2, etc., to log in their account in the software application 116.

The software application 116 is associated with the organizations 126, such that it provides a platform to the user 108 to view their account information associated with those organizations 126. For example, assume that user 108 has a first account 114-1 in the first organization 126-1 which is a financial organization. Also, assume that the user 108 has a second account 114-2 in the second organization 126-1 which is another financial organization. As such, the software application 116 provides a platform to enable the user 108 to view their first account information associated with the first organization 126-1 and second account information associated with the second organization 126-2, such as their financial account balances, transaction statements, etc.

The user 108 is able to view their account information associated with a particular organization 126 (on the software application 116), once their user credentials associated with that particular organization 126 is verified. For example, assume that the user 108 wishes to view their account information associated with a particular organization 126 on the software application 116. As such, when the user 108 is logged in to their account in the software application 116, the user 108 provides their user credentials for their account 114 in that particular organization 126 to the software application 116, e.g., by entering their user credentials in a user interface of the software application 116. Then, those user credentials of the user 108 are sent to an authentication server of the particular organization 126 for verification. If those user credentials of the user 108 are verified, the authentication server of the particular organization 126 generates an authentication token 136 which is unique for the particular account of the user 108 in that particular organization 126. The authentication server of the particular organization 126 shares the authentication token 136 with server 102. With this method, whenever the user 108 wishes to view their account information associated with that particular organization 126 on the software application 116, the server 102 uses the authentication token 136 to receive an access token 138 from a resource server of the particular organization 126. One example of an operational flow for granting access to a user 108 to view a particular account 114 of a user 108 associated with a particular organization 126 on the software application 116 is described in FIG. 4.

Organization database 118 may be implemented using any memory storage including but not limited to cloud-based memory storage comprising data centers, Network-Attached Storage (NAS), etc. Each Organization database 118 is associated with a particular organization 126. Each Organization database 118 is configured to store user behavior information 134 associated with their clients, such as users 108. The organization database 118 stores the user behavior information 134 associated with the user 108 whenever he/she logs into their account 114 associated with the organization 126.

The user behavior information 134 may include any observable behavior and manner of the user 108 while he/she is logged into their account 114. In one embodiment, the user behavior information 134 may include user interactions with peripherals of a user device (e.g., user device 110) from which the user 108 is accessing their account 114, such as a keyboard, a mouse, a webcam, a touchpad, touch screen, etc. Depending on a type of user device 110, the peripherals of the user device 110 may be different. For example, for a desktop type user device 110, the peripherals of the user device 110 may include a keyboard, a mouse, a webcam, etc. In another example, for a laptop type user device 110, the peripherals of the user device 110 may include a keyboard, a touchpad, a webcam, etc. In another example, for a smartphone type user device 110, the peripherals of the user device 110 may include key buttons, a touch screen, a camera, etc. In the example of user interactions with keyboards, the user behavior information 134 may include an average typing speed in a particular period (e.g., words per minute (WPM)), an average typing error in the particular period (e.g., WPM), key hold time, key press intervals, dwell time, typing error patterns, etc.

In the example of user interactions with mouse's, the user behavior information 134 may include mouse movement patterns, an average click speed in the particular period (e.g., clicks per minute (CPM)), an average double click speed in the particular period (e.g., double clicks per minute (DPCM)), an average scroll speed in the particular period (e.g., pixels per second (PPS)), button hold time, click intervals, etc.

In the example of user interactions with touchpads and touch screens, the user behavior information 134 may include touch patterns, a touch click speed in the particular period, a double touch click in the particular period, a scroll speed in the particular period, a button hold time, touch click intervals, etc.

In the example of user interactions with webcam and cameras, the user behavior information 134 may include average blinking rates, iris movements, facial expressions, etc. The organizations 126 send these monitored user behavior information 134 associates with a particular user 108 to the server 102 when the particular user 108 enrolls or registers an account in the software application 116.

The server 102 (via the aggregator 122) uses the monitored user behavior information 134 associated with the particular user 108 for authenticating the particular user 108 while he/she is logged in to their account on the software application 116. Details of the operation of the aggregator 122 are described in conjunction with one embodiment of modeling the aggregator 122 illustrated in FIG. 2 and the method 300 illustrated in FIG. 3.

Processor 120 comprises one or more processors operably coupled to network interface 112, Processor 120 comprises one or more processors operably coupled to network interface 150, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 132) to implement the aggregator 122. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-4. For example, the processor 120 may be configured to perform the steps of method 300 as described in FIG. 3.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instructions 132, user behavior information 134, authentication token 136, access token 138, and/or any other data or instructions. The software instructions 132 may comprise any suitable set of instructions, logic, rules, or code operable to execute the processor 120.

Aggregator

The aggregator 122 may be implemented by the processor 120 executing software instructions 132, and is configured to implement continuous authentication for authenticating the user 108 during the time the user 108 is logged in to their account in the software application 116.

In one embodiment, the aggregator 122 may be implemented using any combinations of a plurality of neural network (NN) layers, convolutional NN (CNN) layers, Long Short Term Memory (LSTM) layers, Recurrent NN (RNN) layers, and/or the like. The aggregator 122 is trained, tested, and refined by adjusting and optimizing weights and biases of perceptrons of these layers. In other embodiments, the aggregator 122 may be implemented using machine learning algorithms, such as Support Vector Machine (SVM), Naive Bayes, Linear Regression, Logistic Regression, k-Nearest Neighbors, Decision trees, etc.

Example for Modeling of the Aggregator

Figure 2:
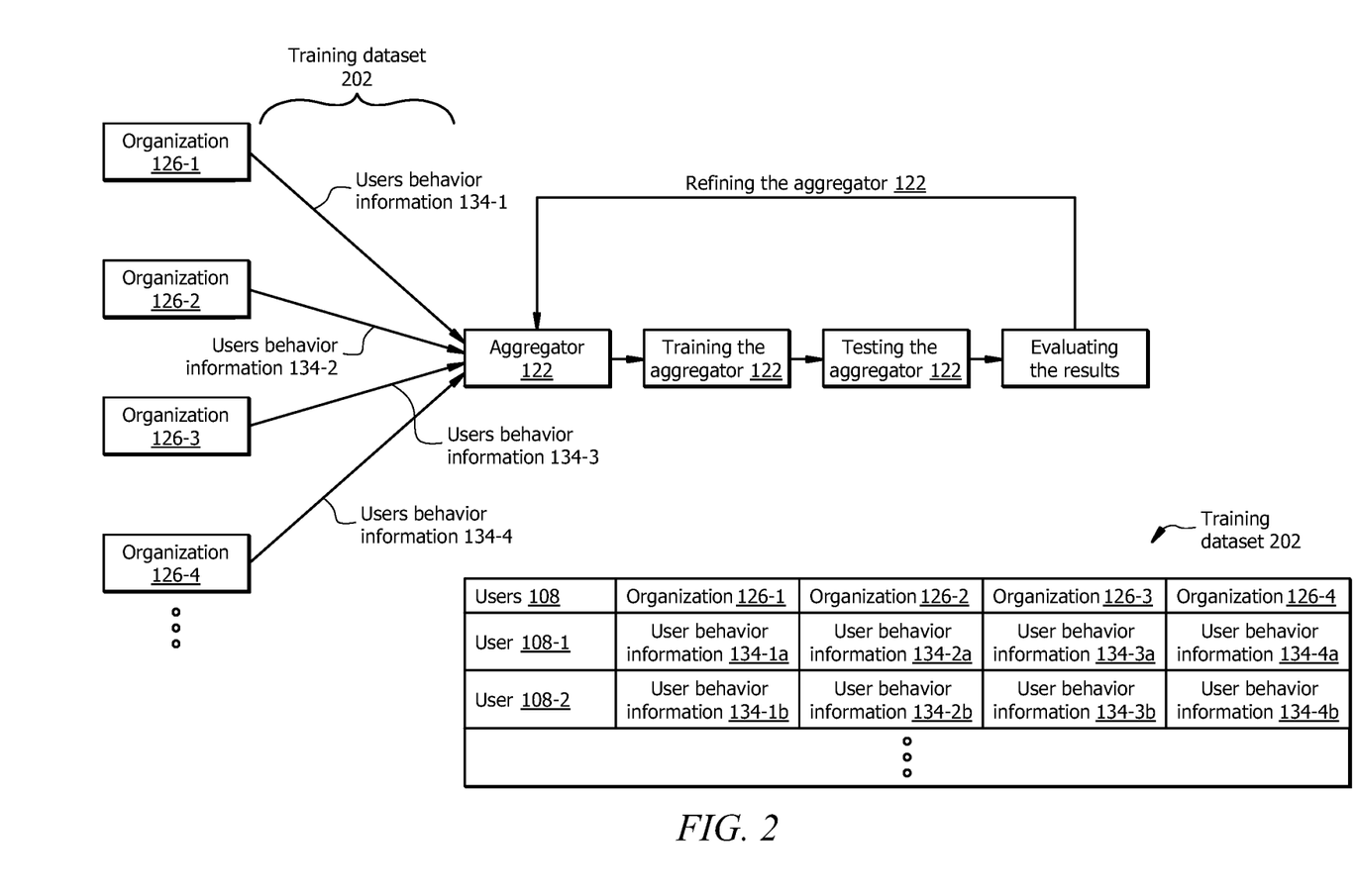
FIG. 2 illustrates an embodiment of modeling an aggregator.

FIG. 2 illustrates an embodiment of modeling the aggregator 122. In one embodiment, the aggregator 122 implements the continuous authentication for authenticating the user 108 using a plurality of monitored user behavior information 134 associated with the user 108 (received from the organizations 126). As such, the aggregator 122 uses the plurality of monitored user behavior information 134 as a training dataset 202 in order to identify and authenticate the user 108 (who is accessing their account on the software application 116).

Each of the plurality of the monitored user behavior information 134 is labeled or associated with a particular user 108. For example, assume that the user 108-1 has a first account is the first organization 126-1, a second account in the second organization 126-2, a third account in the third organization 126-3, and a fourth account in the fourth organization 126-4. As such, these organizations 126 have monitored behavior of the user 108-1 whenever he/she accessed their accounts (associated with those organizations 126) and stored them in user behavior information 134 labeled with the user 108-1. The aggregator 122 receives these monitored user behavior information 134 associated with the user 108-1 for authenticating the user 108-1 while he/she is logged in to the software application 116.

The aggregator 122 is modeled to predict with which user 108 a particular user behavior information 134 is associated. In modeling the aggregator 122, the aggregator 122 is trained, tested, and refined using the monitored user behavior information 134 received from each organization 126 to associate or predict a particular user behavior information 134 with a particular user 108. For example, assume that the aggregator 122 is being modeled to associate or predict a particular user behavior information 134 with the first user 108-1. As such, in the training process, the aggregator 122 is given a first portion of user behavior information 134-1a with their corresponding label (i.e., the first user 108-1) received from the first organization 126-1. The weight and bias values of the neural network layers of the aggregator 122 are adjusted to learn the association and relationship between the first portion of user behavior information 134-1a with the first user 108-1. In this process, the aggregator 122 extracts features of the first portion of user behavior information 134-1a in order to learn a behavioral signature of the first user 108-1. For example, by extracting features of the first portion of user behavior information 134-1a, the aggregator 122 may learn that the first user 108-1 is a fast typist (e.g., has an average typing speed of 70 wpm), errors frequently (e.g., has an average typing error of 10 wpm), errors in entering correct password often (e.g., has an average of 4 failed login attempts out of each 10 successful logins), logs in their account every other day at a certain time of the day (e.g., consistent login timestamps), etc. The aggregator 122 then uses the learned behavioral signature of the user 108-1 in order to associate other portions of user behavior information 134-1a with the user 108-1.

In the testing process, the aggregator 122 is given a second portion of user behavior information 134-1a without their label (i.e., the first user 108-1) and is asked to predict with which user 108, the second set of user behavior information 134-1a is associated. In this process, the aggregator 122 extracts features from the second portion of user behavior information 134-1a and compares them with the extracted features of the first portion of user behavior information 134-1a. If the extracted features from the second portion of user behavior information 134-1a correspond with the extracted features of the first portion of user behavior information 134-1a, the aggregator 122 predicts that the second portion of user behavior information 134-1a is also associated with the first user 108-1.

In other words, the aggregator 122 determines probabilities of the second portion of user behavior information 134-1a being associated with first user 108-1 and other users 108. If the aggregator 122 determines that the probability of the second portion of user behavior information 134-1a being associated with the first user 108-1 is higher than probabilities of the second portion of user behavior information 134-1a being associated with other users 108, it determines that the second portion of user behavior information 134-1a is associated with the first user 108-1.

The aggregator 122 performs this process for every user behavior information 134 associated with different users 108 received from the first organization 126-1. Then aggregator 122 determines an error in predicting or associating those user behavior information 134 with their actual users 108 (i.e., the aggregator 122 determines a first prediction error value associated with the first organization 126-1). The aggregator 122 repeats this process for the user behavior information 134 received from each of the organizations 126. As such, the aggregator 122 determines different prediction error values for user behavior information 134 received from different organizations 126. The aggregator 122 calculates an average prediction error value from these prediction error values. For example, assume that the aggregator 122 has determined a first prediction error value for user behavior information 134-1 received from the first organization 126-1 is 9%. Also, assume that the aggregator 122 has determined a second prediction error value for user behavior information 134-2 received from the second organization 126-2 is 8%. Also, assume that the aggregator 122 has determined a third prediction error value for user behavior information 134-3 received from the third organization 126-3 is 5%. Also, assume that the aggregator 122 has determined a fourth prediction error value for user behavior information 134-4 received from the fourth organization 126-4 is 6%. Thus, the aggregator 122 calculates that the average prediction error value of the first, the second, third, and fourth prediction error values for user behavior information 134, respectively, received from the first, the second, third, and fourth organizations 126-1 to 126-4 is 7%, as shown in TABLE 1.

TABLE 1

Example of prediction error values for user behavior
information 134 received from organizations 126.

| | First organization 126-1 (%) | Second organization 126-2 (%) | Third organization 126-3 (%) | Fourth organization 126-4 (%) | Average organization error (%) |
|---|---|---|---|---|---|
| Prediction process 1 | 9 | 8 | 5 | 6 | 7 |

The aggregator 122 performs a backpropagation process, in which one or more weight and bias values of neural network layers of the aggregator 122 are adjusted. The aggregator 122 repeats the prediction process with the adjusted one or more weight and bias values in its neural network layers and determines a new set of prediction error values for the user behavior information 134 received from the organizations 126. The aggregator 122 performs the prediction process and the backpropagation process until a minimum average prediction error value out of the calculated average prediction error values is achieved. For example, assume that the aggregator 122 has repeated the prediction process discussed above five times, as shown in TABLE 2. Although five prediction processes are illustrated in TABLE 2, it should be understood that any number of prediction processes may be performed until the minimum average prediction error is determined.

TABLE 2

Example of prediction error values for user behavior
information 134 received from each organization 126.

| | First organization 126-1 (%) | Second organization 126-2 (%) | Third organization 126-3 (%) | Fourth organization 126-4 (%) | Average organization error (%) |
|---|---|---|---|---|---|
| Prediction process 1 | 9 | 8 | 5 | 6 | 7 |
| Prediction process 2 | 3 | 6 | 3 | 7 | 4.75 |
| Prediction process 3 | 2 | 2 | 6 | 4 | 3.5 |
| Prediction process 4 | 5 | 2 | 5 | 10 | 4.25 |
| Prediction process 5 | 5 | 2 | 5 | 10 | 5.5 |

Thus, the aggregator 122 determines that the particular weights and biases in neural networks of the aggregator model in the prediction process 3 lead to the minimum average prediction error value, which is 3.5%. Thus, the aggregator model in the prediction process 3 is used as the finalized aggregator 122.

In some cases, particular user behavior information 134 associated with a particular user 108 received from a particular organization 126 may result in a large prediction error value. In one example, the particular user behavior information 134 associated with the particular user 108 received from the particular organization 126 may result in a large prediction error value because of a lack of consistency in the particular user behavior information 134. In another example, the particular user behavior information 134 associated with the particular user 108 received from the particular organization 126 may result in a large prediction error value because of a lack of sufficient data in the particular user behavior information 123 due to the account of the particular user 108 in that particular organization 126 being new. In such cases, the aggregator 122 may determine that particular user behavior information 134 is an outlier. As such, the aggregator 122 excludes the outlier user behavior information 134 associated with the particular user 108 received from the particular organization 126 from consideration in authenticating the particular user 108 while he/she is logged in the software application 116.

For example, the aggregator 122 may determine that a particular user behavior information 134 is an outlier by calculating the differences between the calculated minimum average prediction error value and each of the average prediction error values for each organization 126. The particular user behavior information 134 received from a particular organization 126 which leads to the largest difference between the calculated minimum average prediction error value and the average prediction error value for that particular organization 126 is the outlier. An Example of determining and excluding outlier user behavior information 134 is described in conjunction with method 300 illustrated in FIG. 3.

Continuous Authentication

In the continuous authentication process, the aggregator 122 is configured to authenticate the user 108 while he/she is logged in to their account on the software application 116 by comparing the plurality of monitored user behavior information 134 associated with the user 108 with behaviors of a person who is accessing the account of the user 108. In this process, the aggregator 122 captures user interactions of the person who is accessing the account of the user 108 on the user device 110 from which that person is accessing the account of the user 108. The aggregator 122 extracts features of the behaviors of the person who is accessing the account of the user 108. The aggregator 122 then compares the extracted features of the behaviors of the person accessing the account of the user 108 with the features of the monitored user behavior information 134 associated with the user 108. The aggregator 122 determines whether the extracted features of the behaviors of the person who is accessing the account of the user 108 correspond with the features of the monitored user behavior information 134 associated with the user 108.

In response to a determination that the extracted features of the behaviors of the person who is accessing the account of the user 108 correspond with the features of the monitored user behavior information 134 associated with the user 108, the aggregator 122 determines that person is the same as the user 108. In this case, the aggregator 122 grants the user 108 to stay logged in their account on the software application 116.

In response to a determination that the extracted features of the behaviors of the person who is accessing the account of the user 108 do not correspond with the features of the monitored user behavior information 134 associated with the user 108, the aggregator 122 determines that person is not the user 108. In this case, the aggregator 122 logs out that person from the account of the user 108 on the software application 116.

In one embodiment, the aggregator 122 is configured to continuously or episodically receive newly updated monitored user behavior information 134 associated with users 108. Thus, the aggregator 122 may adjust its model and be retrained using the newly updated monitored user behavior information 134.

Figure 3:
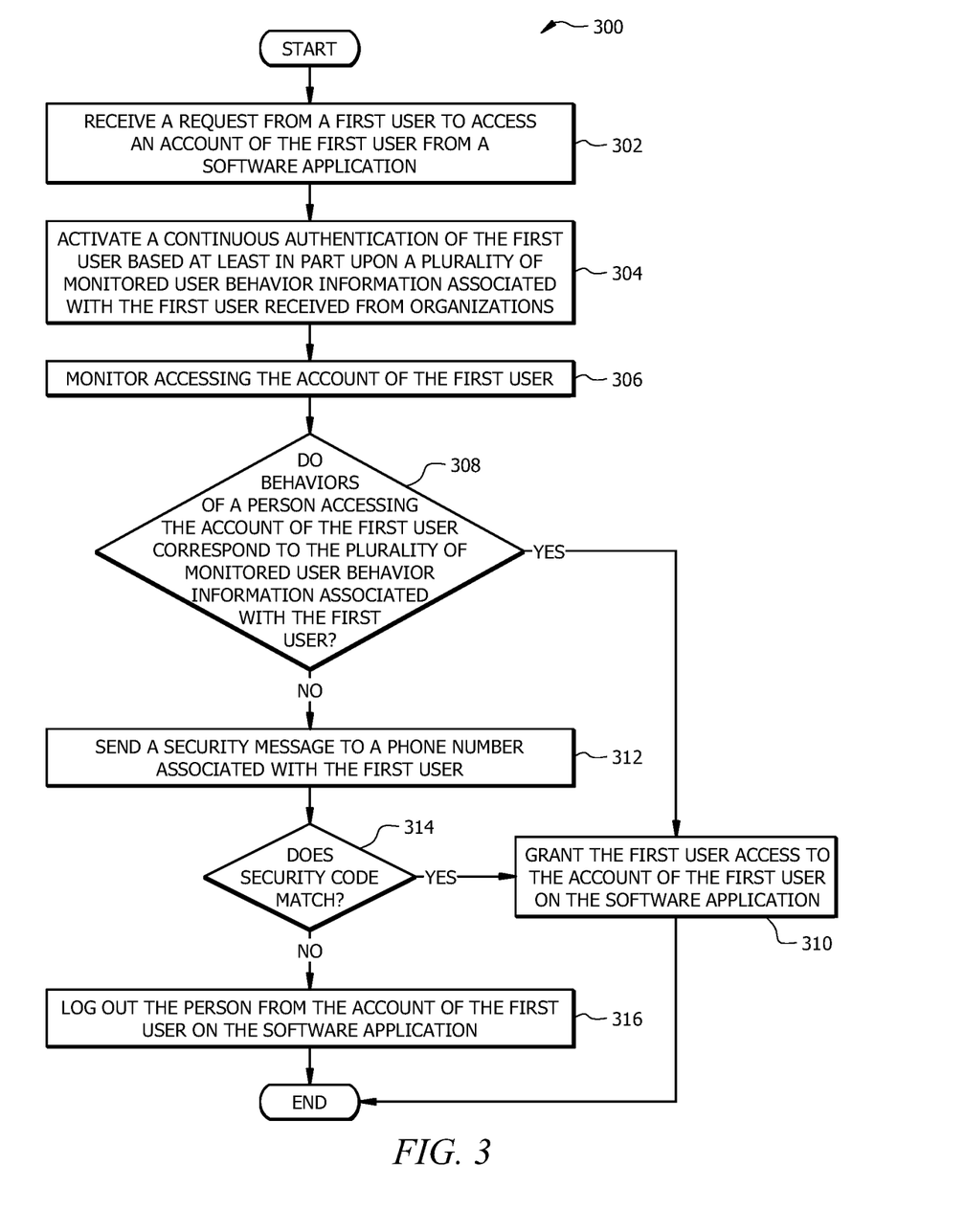
FIG. 3 illustrates an example of a flow chart of a method for implementing continuous authentication for a software application.

Example of a Method for Implementing Continuous Authentication for a Software Application FIG. 3 illustrates a flow chart of a method 300 for implementing a continuous authentication for the software application 116. One or more of steps 302-316 of the method 300 may be implemented, at least in part, in the form of software instructions 132 stored on non-transitory, tangible, machine-readable media (e.g., memory 130) that when run by one or more processors (e.g., processor 120) may cause the one or more processors to perform steps 302-316. In some embodiments, method 300 may be performed on system 100 of FIG. 1, including the server 102, user device 110, processor 120, software application 116, and aggregator 122. Aspects of the steps 302-316 of the method 300 have been covered in the description for FIGS. 1-2; and additional aspects are provided below.

The method 300 beings at step 302 where the aggregator 122 receives a request from the user 108 (e.g., the first user 108-1) to access an account of the user 108 on the software application 116. In one example, the aggregator 122 may receive the request from the first user 108-1 when the first user 108-1 enters their user credentials (i.e., username and password) in a user interface display of the software application 116 on the user device 110. In another example, the user 108-1 may choose another of their user credentials 124 associated with another organization (e.g., their email account credentials, social media credentials, etc.) to login to the software application 116, as described in FIG. 1. At this stage, the first user 108-1 has successfully accessed their account on the software application 116.

In step 304, the aggregator 122 activates the continuous authentication of the first user 108-1 based on the plurality of monitored user behavior information 134 associated with the first user 108-1 which was previously received from the organizations 126. The purpose of activating the continuous authentication is to continuously determine whether a person who is accessing the account of the first user 108-1 on the software application 116 is the same as the first user 108-1.

In step 306, the aggregator 122 monitors accessing the account of the first user 108-1 on the software application 116. In this process, the aggregator 122 captures any user interaction with the user device 110 from which the first user 108-1 is logged in to their account on the software application 116.

In other words, the aggregator 122 determines the behaviors of a person who is accessing the account of the first user 108-1 on the software application 116, as described in FIG. 1. In one example, assume that the user device 110 is a desktop. As such, the aggregator 122 may capture user interactions with a keyboard, a mouse, and a webcam of the desktop in order to determine the behaviors of the person (accessing the account of the first user 108-1) with respect to the keyboard, mouse, and webcam of the desktop. In another example, assume that the user device 110 is a laptop. As such, the aggregator 122 may capture user interactions with a keyboard, a touchpad, and a camera of the laptop in order to determine the behaviors of that person (accessing the account of the first user 108-1) with respect to the keyboard, the touchpad, and camera of the laptop. In another example, assume that the user device 110 is a smartphone. As such, the aggregator 122 may capture user interactions with a touch screen, key buttons, and camera of the smartphone in order to determine the behaviors of that person (accessing the account of the first user 108-1) with respect to the touch screen, key buttons, and camera of the smartphone. The aggregator 122 uses this information in authorizing access to the account of the first user 108-1 while the first user 108-1 is logged in their account on the software application 116.

In one embodiment, if the aggregator 122 determines that the account of the first user 108-1 is being accessed from a particular type of user device 110 (e.g., a desktop, a laptop, a smartphone, etc.), the aggregator 122 may prioritize particular user behavior information 134 associated with the first user 108-1 which is also labeled with that particular type of user device 110. The aggregator 122 may determine the type of the user device 110, for example, by detecting the IP address associated with that user device 110 and determining that this IP address is originating from a particular type of user device 110. For example, if the aggregator 122 determines that the account of the user 108-1 is being accessed from a desktop, it may prioritize those monitored user behavior information 134 associated with the first user 108-1 which is also labeled with desktop. As such, the aggregator 122 may use weighted user behavior information 134 associated with the first user 108-1, in which those user behavior information 134 what are labeled with the same type of the user device 110 as the account of the first user 108-1 is being accessed from are weighted a higher value (e.g., x1.2, x2.5, etc.).

In step 308, the aggregator 122 determines whether behaviors of the person accessing the account of the first user 108-1 correspond to the plurality of monitored user behavior information 134 associated with the first user 108-1. In this process, the aggregator 122 compares the behaviors of the person accessing the account of the first user 108-1 with the plurality of monitored user behavior information 134 associated with the first user 108-1, such as described in FIG. 2.

The aggregator 122 compares each feature from the behaviors of the person who is accessing the account of the first user 108-1 with its corresponding feature from the plurality of monitored user behavior information 134 associated with the first user 108-1. The aggregator 122 then determines whether a majority (e.g., at least 70%, 80%, or any other configured majority percentage) of the features from the behaviors of the person who is accessing the account of the first user 108-1 correlate with their corresponding features from the plurality of monitored user behavior information 134 associated with the first user 108-1.

In response to a determination that the majority of features from the behaviors of the person accessing the account of the first user 108-1 correlate with their corresponding features from among the plurality of monitored user behavior information 134 associated with the first user 108-1, the method 300 proceeds to step 310, where the aggregator 122 grants the first user 108-1 access to their account on the software application 116. In other words, the aggregator 122 determines that the person who is accessing the account of the first user 108-1 is the same first user 108-1, if the behaviors of the person who is accessing the account of the first user 108-1 correspond to the plurality of monitored user behavior information 134 associated with the first user 108-1.

In response to a determination that the majority of features from the behaviors of the person accessing the account of the first user 108-1 do not correlate with their corresponding features from among the plurality of monitored user behavior information 134 associated with the first user 108-1, the method 300 proceeds to perform steps 312-314.

In one example, assume that the aggregator 122 has determined five features of the behaviors of the person who is accessing the account of the first user 108-1, as shown in TABLE 3. The monitored behavior examples illustrated in TABLE 3 are not meant to limit the scope of this disclosure.

In other examples, other behaviors of the person accessing the account of the first user 108-1 may be captured and analyzed as discussed above.

TABLE 3

Example of determined behaviors of the person accessing
the account of the first user 108-1.

| Average typing speed (WPM) | Average typing error (WPM) | Clickspeed (CPM) | Double click speed (DCPM) | Average scroll speed (PPS) |
|---|---|---|---|---|
| 80 | 10 | 5 | 10 | 100 |

Also, assume that the corresponding features with their threshold values from the plurality of monitored user behavior information 134 associated with the first user 108-1 are as shown in TABLE. 4. The monitored behavior examples illustrated in TABLE 4 are not meant to limit the scope of this disclosure. In other examples, other behaviors of the first user 108-1 may be captured and analyzed as discussed above.

TABLE 4

First example of corresponding features in the plurality of monitored
user behavior information 134 associated with the first user 108-1.

| Average typing speed (WPM) | Average typing error (WPM) | clickspeed (CPM) | doubleclick speed (DCPM) | scrollspeed (PPS) |
|---|---|---|---|---|
| 78 ± 5 | 6 ± 7 | 7 ± 3 | 13 ± 4 | 160 ± 30 |

Also, assume that the aggregator 122 has configured such that at least 70% of the features of the plurality of monitored user behavior information 134 associated with the first user 108-1 should correspond to the behaviors of the person who is accessing the account of the first user 108-1, in order to determine that person is the same as the first user 108-1. In this particular example, the aggregator 122 compares each feature in TABLE 3 with its corresponding feature in TABLE 4. As such, the aggregator 122 determines that the average typing speed, average typing error, click speed, and double click speed features in TABLE 3 (i.e., the determined behaviors of the person accessing the account of the first user 108-1) correlate with their corresponding feature in TABLE 4 (i.e., the features from the plurality of monitored user behavior information 134 associated with the first user 108-1). Thus, the aggregator 122 determines that 80% of the features from the determined behaviors of the person accessing the account of the first user 108-1 correlate with their corresponding feature from the plurality of monitored user behavior information 134 associated with the first user 108-1. As such, the aggregator 122 determines that the person who is accessing the account of the first user 108-1 is the same as the user 108-1. In this case, the method proceeds to step 310, where the aggregator 122 grants the first user 108-1 access to their account on the software application 116.

In another example, assume that the aggregator 122 has determined five features of the behaviors of the person who is accessing the account of the first user 108-1, as shown in TABLE 5. The monitored behavior examples illustrated in TABLE 5 are not meant to limit the scope of this disclosure. In other examples, other behaviors of the person accessing the account of the first user 108-1 may be captured and analyzed as discussed above.

TABLE 5

Second example of determined behaviors of the person
accessing the account of the first user 108-1.

| Average typing speed (WPM) | Average typing error (WPM) | Clickspeed (CPM) | Double click speed (DCPM) | Average scroll speed (PPS) |
|---|---|---|---|---|
| 60 | 10 | 5 | 10 | 100 |

Thus, by comparing the features in TABLE 5 with their corresponding features in TABLE 4, the aggregator 122 determines that the average typing error, click speed, and double click speed features in TABLE 5 correlate with their corresponding feature in TABLE 4.

Thus, the aggregator 122 determines that 60% of the features from the determined behaviors of the person accessing the account of the first user 108-1 correlate with their corresponding feature from the plurality of monitored user behavior information 134 associated with the first user 108-1. In this particular example, since less than the configured percentage of the features from the determined behaviors of the person accessing the account of the first user 108-1 (i.e., less than 70%) correlate with their corresponding feature from the plurality of monitored user behavior information 134 associated with the first user 108-1, the aggregator 122 determines that person is not the same as the user 108-1. In this case, the method proceeds to step 312.

In one embodiment, if the aggregator 122 determines that the behaviors of the person accessing the account of the first user 108-1 do not correspond to the plurality of monitored user behavior information 134 associated with the first user 108-1, the aggregator 122 may determine and exclude one or more outliers from the monitored user behavior information 134 associated with the first user 108-1. Referring back to the example discussed in TABLE 2, the aggregator 122 determined that the monitored user behavior information 134-3a (associated with the first user 108-1 which was received from the third organization 126-3) has led to the largest prediction error value compared to other monitored user behavior information 134 associated with the first user 108-1 received from other organizations 126. Thus, the aggregator 122 determined that the monitored user behavior information 134-3a received from the third organization 126-3 is an outlier. Thus, the aggregator 122 excludes the monitored user behavior information 134-3a from consideration in authenticating the first user 108-1. As such, the aggregator 122 determines whether the behaviors of the person accessing the account of the first user 108-1 correspond to the monitored user behavior information 134-1a, 134-2a, and 134-4a, respectively, received from the first organization 126-1, second organization 126-2, and fourth organization 126-4.

In step 312, the aggregator 122 sends a security message to a phone number associated with the account of the first user 108-1 on the software application 116. The security message may include a security code that includes any combination of numbers, alphabets, symbols, etc. The security message may also include a message indicating to enter the security code in the software application 116, e.g., in a user interface of the software application 116.

In step 314, the aggregator 122 determines whether the received security code in the software application 116 matches the security code sent to the phone number of the first user 108-1. In response to a determination that the received security code in the software application 116 does not match the security code sent to the phone number of the first user 108-1, the method 300 proceeds to step 316.

In step 316, the aggregator 122 logs out the person (who is accessing the account of the first user 108-1) from the account of the first user 108-1 on the software application 116. In other words, the aggregator 122 determines that the person who is accessing the account of the first user 108-1 is not the same as the first user 108-1. Thus, the aggregator revokes access to the account of the first user 108-1 on the software application 116.

In response to a determination that the received security code in the software application 116 matches the security code sent to the phone number of the first user 108-1, the method 300 proceeds to step 310.

While the first user 108-1 is logged in to their account in the software application 116, the first user 108-1 may wish to view their account information associated with a particular organization 126. Details of an example of an operational flow of granting the first user 108-1 access to view their account information associated with a particular organization 126 are described in FIG. 4.

Figure 4:
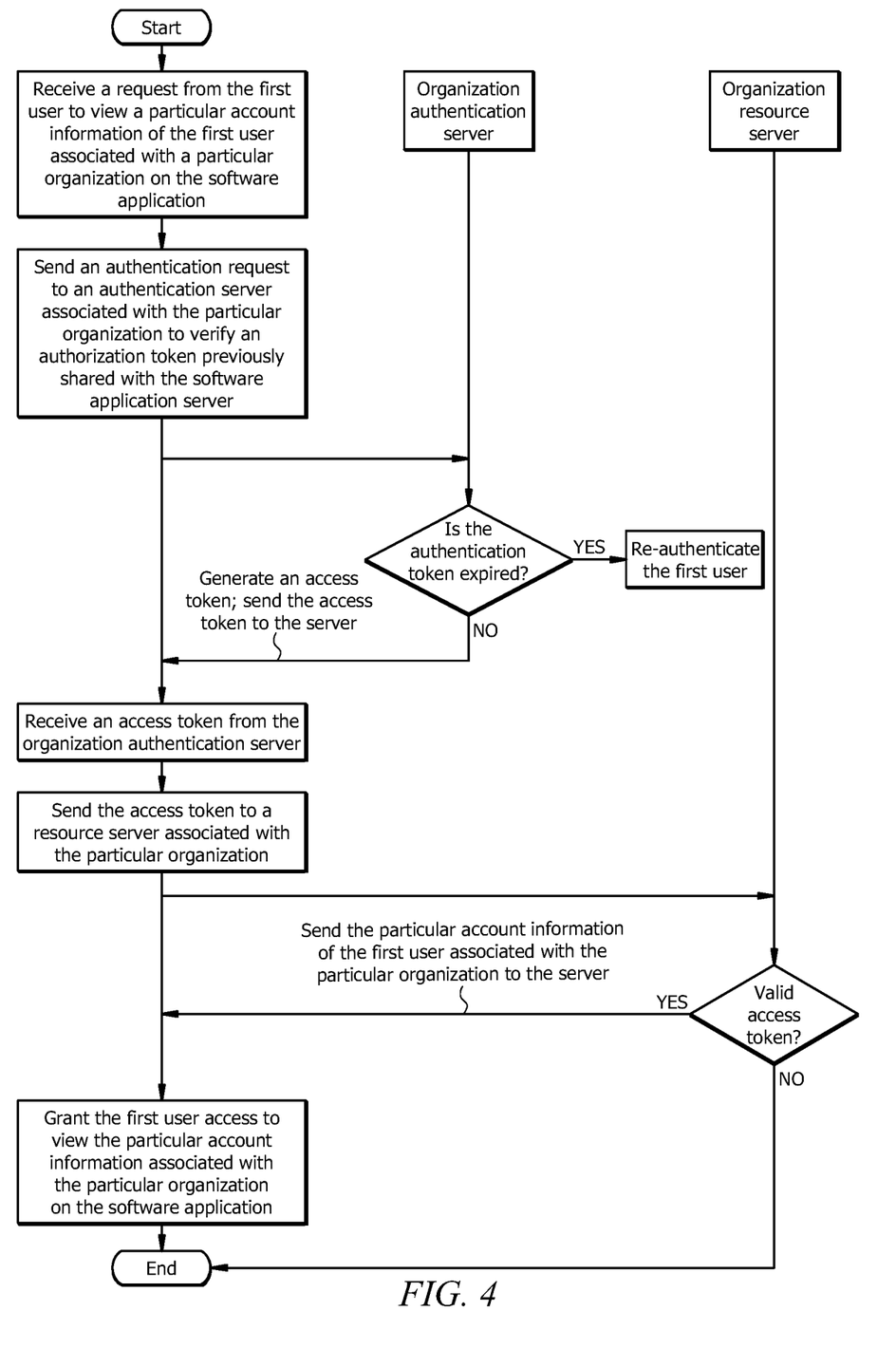
FIG. 4 illustrates an example of an operational flow for granting access to a particular account associated with a particular organization on a software application.

FIG. 4 illustrates an example of an operational flow of system 100 from FIG. 1 for granting the first user 108-1 to view their account associated with a particular organization 126 on the software application 116. As discussed above, the software application 116 provides a platform for the users 108 (e.g., the first user 108-1) to view their account information associated with organizations 126.

In this particular example, assume that the aggregator 122 has determined that the first user 108-1 is logged to their account on the software application 116, as discussed in step 310 of method 300 in FIG. 3. Also, assume that the first user 108-1 wishes to view a particular account information of theirs associated with a particular organization 126 on the software application 116. As such, the aggregator 122 receives a request from the first user 108-1 to view the particular account information of the first user 108-1 associated with the particular organization 126 on the software application 116. The aggregator 122 sends an authentication request to an authentication server of the particular organization 126 to verify an authentication token 136 (associated with the particular account of the first user 108-1) previously shared with the server 102, as described in FIG. 1.

In verifying the authentication token 136, the authentication server of the particular organization 126 determines whether the authentication token 136 received from the server 102 is expired. The authentication token may expire in two months, three months, or any other suitable duration from the date it was generated by the authentication server of the particular organization 126.

In response to a determination that the authentication token 136 is expired, the authentication server of the particular organization 126 re-authenticates the first user 108-1, for example by asking the user 108-1 to provide their user credentials for the particular account of the user 108-1 associated with the particular organization 126. In response to a determination that the authentication token 136 is not expired, the authentication server of the particular organization 126 generates an access token 138 for the particular account information of the first user 108-1.

In some examples, the access token 138 is used for each session the user 108-1 requests to access the particular account information associated with the particular organization 126 from the software application 116. As such, the access token 138 may expire in a short period, such as five minutes, ten minutes, or any other suitable time. The access token 138 may also expire when the user 108-1 has logged out from the software application 116.

The authentication server of the particular organization 126 sends the access token 138 to the server 102. The authentication server of the particular organization 126 also sends the access token 138 to a resource server of the particular organization 126. The server 102 receives the access token 138 from the authentication server of the particular organization 126. The server 102 sends the access token 138 to the resource server of the particular organization 126 for verification. The resource server of the particular organization 126 determines whether the access token 138 is valid. In this process, the resource server of the particular organization 126 compares the access token 138 received from server 102 with an access token previously received from the authentication server of the particular organization 126.

If the access token 138 received from the server 102 matches with the access token previously received from the authentication server of the particular organization 126, the resource server of the particular organization 126 determines that the access token 138 received from the server 102 is valid. The resource server of the particular organization 126 may also determine whether the access token received from server 102 is expired. If the resource server of the particular organization 126 determines that the access token received from the server 102 is expired, the resource server of the particular organization 126 sends a message to the server 102 that the access token 138 is expired. If, however, the resource server of the particular organization 126 determines that the access token 138 received from the server 102 is not expired, it sends the particular account information of the first user 108-1 associated with the particular organization 126 to be viewed on the software application 116. As such, the aggregator 122 grants the first user 108-1 to view the particular account information of the first user 108-1 associated with the particular organization 126 on the software application 116.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for implementing continuous authentication for a software application, the system comprising:
a memory operable to store monitored user behavior information associated with a first user received from one or more organizations, wherein:
the first user is a client of the one or more organizations, wherein the monitored user behavior information associated with the first user comprises behaviors of the first user while the first user has been accessing a particular account of the first user associated with each organization from among the one or more organizations;
each of the monitored user behavior information is labeled with a respective type of user device associated with a user device from which the first user has been accessing the particular account;
the type of user device comprises one or more of a desktop computer, a laptop, or a smartphone; and
the monitored user behavior information comprises one or more of facial expressions, eye movement, or average blinking rate associated with the first user in a particular period, wherein the facial expressions, the eye movement, and the average blinking rate are captured by cameras operably coupled with user devices from which the first user has been accessing the particular account; and
a processor, associated with a server, operably coupled to the memory, configured to:
receive a request from the first user to access an account of the first user on a software application, wherein:
the software application uses an open authentication to allow the first user to log in to the account of the first user on the software application by authenticating another account of the first user associated with a different organization; and
the one or more organizations are associated with the software application;
activate a continuous authentication of the first user based at least in part upon a plurality of monitored user behavior information received from the one or more organizations, wherein, in continuous authentication, the processor uses the plurality of monitored user behavior information associated with the first user to determine whether the first user is accessing the account of the first user on the software application;
determine that a first monitored user behavior information from among the plurality of monitored user behavior information is an outlier user behavior information, wherein determining that the first monitored user behavior information is the outlier user behavior information comprises:
comparing the first monitored user behavior information with at least a portion of the rest of the plurality of monitored user behavior information; and
determining that the first monitored user behavior leads to a largest prediction error, from among a plurality of prediction errors determined for the rest of the plurality of monitored user behavior information, in conjunction with verifying the identity of the first user;
exclude the outlier user behavior information from consideration in the continuous authentication of the first user;
monitor accessing the account of the first user by monitoring behaviors of a person who is accessing the account of the first user on the software application;
determine whether the behaviors of the person who is accessing the account of the first user correspond to the plurality of monitored user behavior information associated with the first user, wherein determining whether the behaviors of the person correspond to the plurality of monitored user behavior information comprises:
determining that the person is accessing the account of the first user from a particular use device that is associated with a particular type of user device, based at least in part upon an internet protocol (IP) address associated with the particular user device, wherein the particular type of user device indicates that the particular user device is a desktop computer, a laptop, or a smartphone;
determining that a particular monitored user behavior information from among the plurality of monitored user behavior information is labeled with the particular type of user device;
assigning a higher weight value to the particular monitored user behavior information compared to the rest of the monitored user behavior information; and
using a weighted sum of weight values associated with the plurality of monitored user behavior information in connection to determining whether the behaviors of the person correspond to the plurality of monitored user behavior information; and
in response to a determination that the behaviors of the person accessing the account of the first user correspond to the plurality of monitored user behavior information associated with the first user:
determine that the person accessing the account of the first user is the same as the first user; and
grant the first user access to the account of the first user.

2. The system of claim 1, wherein the processor is further configured to:
in response to a determination that the behaviors of the person accessing the account of the first user do not correspond to the plurality of monitored user behavior information associated with the first user:
determine that the person accessing the account of the first user is not the same as the first user; and
log out that person from the account of the first user.

3. The system of claim 1, wherein the one or more organizations are associated with the software application by the first user registering the account of the first user in the software application with one or more accounts of the first user in the one or more organizations.

4. The system of claim 1, wherein monitoring behaviors of the person accessing the account of the first user on the software application comprises:
determining facial expressions of that person in the particular period;
determining eye movement of that person in the particular period; and
determining average blinking rate associated with that person in the particular period.

5. The system of claim 1, wherein determining whether the behaviors of the person accessing the account of the first user correspond to the plurality of monitored user behavior information associated with the first user received from the one or more organizations comprises:
for each feature from among the plurality of monitored user behavior information associated with the first user received from the one or more organizations:
determining a first value of the feature in the particular period;
determining a second value of a corresponding feature from among the behaviors of the person accessing the account of the first user in the particular period;
determining whether the first value of the feature is within a particular threshold value from the second value of the corresponding feature;
determining whether a majority of features from among the plurality of monitored user behavior information associated with the first user is within their corresponding particular threshold values from their corresponding feature from among the behaviors of the person accessing the account of the first user in the particular period; and
in response to determining that the majority of features from among the plurality of monitored user behavior information associated with the first user is within their corresponding particular threshold values from their corresponding feature from among the behaviors of the person accessing the account of the first user, determine that the behaviors of that person correspond to the plurality of monitored user behavior information associated with the first user.

6. The system of claim 5, wherein:
in response to determining that the majority of features from among the plurality of monitored user behavior information associated with the first user is not within their corresponding particular threshold values from their corresponding feature from among the behaviors of the person accessing the account of the first user, determine that the behaviors of that person do not correspond to the plurality of monitored user behavior information associated with the first user.

7. The system of claim 1, wherein the processor is further configured to:
send a security code to a phone number of the first user associated with the software application;
request the first user to confirm the security code by entering the security code in the software application;
determine whether the security code received from the first user matches the security code sent to the phone number of the first user;
in response to a determination that the security code received from the first user matches the security code sent to the phone number of the first user, continue granting the first user access to the account of the first user; and
in response to a determination that the security code received from the first user does not match the security code sent to the phone number of the first user; revoke access to the account of the first user on the software application.

8. A method for implementing continuous authentication for a software application, the method comprising:
receiving a request from a first user to access an account of the first user on a software application, wherein:
the software application uses an open authentication to allow the first user to log in to the account of the first user on the software application by authenticating another account of the first user associated with a different organization;
activating a continuous authentication of the first user based at least in part upon a plurality of monitored user behavior information received from one or more organizations, wherein:
in continuous authentication, the plurality of monitored user behavior information associated with the first user is used to determine whether the first user is accessing the account of the first user on the software application;
the plurality of monitored user behavior information associated with the first user comprises behaviors of the first user while the first user has been accessing a particular account of the first user associated with each organization from among the one or more organizations;
each of the monitored user behavior information is labeled with a respective type of user device associated with a user device from which the first user has been accessing the particular account;
the type of user device comprises one or more of a desktop computer, a laptop, or a smartphone; and
the monitored user behavior information comprises one or more of facial expressions, eye movement, or average blinking rate associated with the first user in a particular period, wherein the facial expressions, the eye movement, and the average blinking rate are captured by cameras operably coupled with user devices from which the first user has been accessing the particular account;
determining that a first monitored user behavior information from among the plurality of monitored user behavior information is an outlier user behavior information, wherein determining that the first monitored user behavior information is the outlier user behavior information comprises:
comparing the first monitored user behavior information with at least a portion of the rest of the plurality of monitored user behavior information; and
determining that the first monitored user behavior leads to a largest prediction error, from among a plurality of prediction errors determined for the rest of the plurality of monitored user behavior information, in conjunction with verifying the identity of the first user;
excluding the outlier user behavior information from consideration in the continuous authentication of the first user;
monitoring accessing the account of the first user by monitoring behaviors of a person who is accessing the account of the first user on the software application;
determining whether the behaviors of the person who is accessing the account of the first user correspond to the plurality of monitored user behavior information associated with the first user, wherein determining whether the behaviors of the person correspond to the plurality of monitored user behavior information comprises:
determining that the person is accessing the account of the first user from a particular use device that is associated with a particular type of user device, based at least in part upon an internet protocol (IP) address associated with the particular user device, wherein the particular type of user device indicates that the particular user device is a desktop computer, a laptop, or a smartphone;
determining that a particular monitored user behavior information from among the plurality of monitored user behavior information is labeled with the particular type of user device;
assigning a higher weight value to the particular monitored user behavior information compared to the rest of the monitored user behavior information; and
using a weighted sum of weight values associated with the plurality of monitored user behavior information in connection to determining whether the behaviors of the person correspond to the plurality of monitored user behavior information; and
in response to a determination that the behaviors of the person accessing the account of the first user correspond to the plurality of monitored user behavior information associated with the first user:
determining that the person accessing the account of the first user is the same as the first user; and
granting the first user access to the account of the first user.

9. The method of claim 8, wherein the method is further comprising:
in response to a determination that the behaviors of the person accessing the account of the first user do not correspond to the plurality of monitored user behavior information associated with the first user:
determining that the person accessing the account of the first user is not the same as the first user; and
logging out that person from the account of the first user.

10. The method of claim 8, wherein the one or more organizations are associated with the software application by the first user registering the account of the first user in the software application with one or more accounts of the first user in the one or more organizations.

11. The method of claim 8, wherein monitoring behaviors of the person accessing the account of the first user on the software application comprises:
determining an average typing speed of that person in a particular period;
determining an average typing error of that person in the particular period; and
determining mouse movement patterns associated with that person in the particular period.

12. The method of claim 8, wherein determining whether the behaviors of the person accessing the account of the first user correspond to the plurality of monitored user behavior information associated with the first user received from the one or more organizations comprises:
for each feature from among the plurality of monitored user behavior information associated with the first user received from the one or more organizations:
determining a first value of the feature in the particular period;
determining a second value of a corresponding feature from among the behaviors of the person accessing the account of the first user in the particular period;
determining whether the first value of the feature is within a particular threshold value from the second value of the corresponding feature;
determining whether a majority of features from among the plurality of monitored user behavior information associated with the first user is within their corresponding particular threshold values from their corresponding feature from among the behaviors of the person accessing the account of the first user in the particular period; and
in response to determining that the majority of features from among the plurality of monitored user behavior information associated with the first user is within their corresponding particular threshold values from their corresponding feature from among the behaviors of the person accessing the account of the first user, determine that the behaviors of that person correspond to the plurality of monitored user behavior information associated with the first user.

13. The method of claim 12, wherein:
in response to determining that the majority of features from among the plurality of monitored user behavior information associated with the first user is not within their corresponding particular threshold values from their corresponding feature from among the behaviors of the person accessing the account of the first user, determining that the behaviors of that person do not correspond to the plurality of monitored user behavior information associated with the first user.

14. The method of claim 8, wherein the method is further comprising:
sending a security code to a phone number of the first user associated with the software application;
requesting the first user to confirm the security code by entering the security code in the software application;
determining whether the security code received from the first user matches the security code sent to the phone number of the first user;
in response to a determination that the security code received from the first user matches the security code sent to the phone number of the first user, continuing granting the first user access to the account of the first user; and
in response to a determination that the security code received from the first user does not match the security code sent to the phone number of the first user; revoking access to the account of the first user on the software application.

15. A non-transitory computer-readable medium storing instructions that when executed by a processor cause the processor to:
receive a request from a first user to access an account of the first user on a software application, wherein:
the software application uses an open authentication to allow the first user to log in to the account of the first user on the software application by authenticating another account of the first user associated with a different organization;
activate a continuous authentication of the first user based at least in part upon a plurality of monitored user behavior information received from one or more organizations, wherein:
in continuous authentication, the processor uses the plurality of monitored user behavior information associated with the first user to determine whether the first user is accessing the account of the first user on the software application;
the plurality of monitored user behavior information associated with the first user comprises behaviors of the first user while the first user has been accessing a particular account of the first user associated with each organization from among the one or more organizations;
each of the monitored user behavior information is labeled with a respective type of user device associated with a user device from which the first user has been accessing the particular account;
the type of user device comprises one or more of a desktop computer, a laptop, or a smartphone; and the monitored user behavior information comprises one or more of facial expressions, eye movement, and average blinking rate associated with the first user in a particular period, wherein the facial expressions, the eye movement, or the average blinking rate are captured by cameras operably coupled with user devices from which the first user has been accessing the particular account;

determine that a first monitored user behavior information from among the plurality of monitored user behavior information is an outlier user behavior information, wherein determining that the first monitored user behavior information is the outlier user behavior information comprises:

comparing the first monitored user behavior information with at least a portion of the rest of the plurality of monitored user behavior information; and determining that the first monitored user behavior leads to a largest prediction error, from among a plurality of prediction errors determined for the rest of the plurality of monitored user behavior information, in conjunction with verifying the identity of the first user;

exclude the outlier user behavior information from consideration in the continuous authentication of the first user;

monitor accessing the account of the first user by monitoring behaviors of a person who is accessing the account of the first user on the software application;

determine whether the behaviors of the person who is accessing the account of the first user correspond to the plurality of monitored user behavior information associated with the first user, wherein determining whether the behaviors of the person correspond to the plurality of monitored user behavior information comprises:

determining that the person is accessing the account of the first user from a particular use device that is associated with a particular type of user device, based at least in part upon an internet protocol (IP) address associated with the particular user device, wherein the particular type of user device indicates that the particular user device is a desktop computer, a laptop, or a smartphone;

determining that a particular monitored user behavior information from among the plurality of monitored user behavior information is labeled with the particular type of user device;

assigning a higher weight value to the particular monitored user behavior information compared to the rest of the monitored user behavior information; and using a weighted sum of weight values associated with the plurality of monitored user behavior information in connection to determining whether the behaviors of the person correspond to the plurality of monitored user behavior information; and in response to a determination that the behaviors of the person accessing the account of the first user correspond to the plurality of monitored user behavior information associated with the first user:

determine that the person accessing the account of the first user is the same as the first user; and grant the first user access to the account of the first user.

16. The non-transitory computer-readable medium of claim 15, wherein the instructions when executed by the processor further cause the processor to:

in response to a determination that the behaviors of the person accessing the account of the first user do not correspond to the plurality of monitored user behavior information associated with the first user:

determine that the person accessing the account of the first user is not the same as the first user; and log out that person from the account of the first user.

17. The non-transitory computer-readable medium of claim 15, wherein the one or more organizations are associated with the software application by the first user registering the account of the first user in the software application with one or more accounts of the first user in the one or more organizations.

18. The non-transitory computer-readable medium of claim 15, wherein monitoring behaviors of the person accessing the account of the first user on the software application comprises:

determining facial expressions of that person in the particular period;

determining eye movement of that person in the particular period; and determining average blinking rate associated with that person in the particular period.

19. The non-transitory computer-readable medium of claim 15, wherein determining whether the behaviors of the person accessing the account of the first user correspond to the plurality of monitored user behavior information associated with the first user received from the one or more organizations comprises:

for each feature from among the plurality of monitored user behavior information associated with the first user received from the one or more organizations:

determining a first value of the feature in the particular period;

determining a second value of a corresponding feature from among the behaviors of the person accessing the account of the first user in the particular period;

determining whether the first value of the feature is within a particular threshold value from the second value of the corresponding feature;

determining whether a majority of features from among the plurality of monitored user behavior information associated with the first user is within their corresponding particular threshold values from their corresponding feature from among the behaviors of the person accessing the account of the first user in the particular period; and in response to determining that the majority of features from among the plurality of monitored user behavior information associated with the first user is within their corresponding particular threshold values from their corresponding feature from among the behaviors of the person accessing the account of the first user, determine that the behaviors of that person correspond to the plurality of monitored user behavior information associated with the first user.

20. The non-transitory computer-readable medium of claim 19, wherein:

in response to determining that the majority of features from among the plurality of monitored user behavior information associated with the first user is not within their corresponding particular threshold values from their corresponding feature from among the behaviors of the person accessing the account of the first user, determine that the behaviors of that person do not correspond to the plurality of monitored user behavior information associated with the first user.

* * * * *